United States Patent
Itou et al.

(10) Patent No.: US 6,742,336 B2
(45) Date of Patent: Jun. 1, 2004

(54) STEAM TURBINE POWER PLANT

(75) Inventors: Shuuichi Itou, Kanasagou-machi (JP); Masahiko Sugano, Mito (JP); Norikazu Hamaura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/092,915

(22) Filed: Mar. 8, 2002

(65) Prior Publication Data

US 2003/0043952 A1 Mar. 6, 2003

(30) Foreign Application Priority Data

Aug. 31, 2001 (JP) ........................ 2001-262648

(51) Int. Cl.$^7$ .................... F01K 13/02; F01K 21/06; F01K 7/22; G21D 5/00
(52) U.S. Cl. .................... 60/646; 60/644.1; 60/653; 60/657; 60/679
(58) Field of Search .................... 60/653, 679, 657, 60/646, 644.1

(56) References Cited

U.S. PATENT DOCUMENTS 4,387,577 A * 6/1983 Campbell ........................ 60/657
5,793,831 A * 8/1998 Tsiklauri et al. ............... 60/653
6,422,017 B1 * 7/2002 Bassily ........................... 60/653

FOREIGN PATENT DOCUMENTS

JP 62218606 A * 9/1987 ............ F01K/7/22
JP 62-218606 9/1987 ................ 60/644.1

* cited by examiner

Primary Examiner—Sheldon J. Richter
(74) Attorney, Agent, or Firm—Mattingly, Stanger & Malur, P.C.

(57) ABSTRACT

A steam turbine power plant comprises a high-pressure turbine to be driven by steam generated by a steam generator, a first reheater for separating moisture from steam discharged from the high-pressure turbine and heating the steam, an intermediate-pressure turbine to be driven by the steam heated by the first reheater, a second reheater for heating exhaust steam discharged from the intermediate-pressure turbine, and a low-pressure turbine to be driven by the steam heated by the second reheater. The intermediate-pressure turbine discharges dry steam.

9 Claims, 6 Drawing Sheets

STEAM TURBINE POWER PLANT

BACKGROUND OF THE INVENTION

The present invention relates to a steam turbine power plant.

A conventional nuclear power plant has a power generating system including a high-pressure steam turbine driven by steam generated by a nuclear reactor, a reheater for heating exhaust steam discharged from the high-pressure turbine to reduce moisture content, and a low-pressure turbine driven by the reheated exhaust steam. Steam generated by a nuclear reactor is saturated steam owing to the characteristic of the nuclear reactor and hence the exhaust steam discharged from the high-pressure turbine has a wetness fraction on the order of 10%. Reduction of the wetness fraction of the exhaust steam is effective in retarding the corrosion of the internal components of the turbine and the improvement of power generating efficiency.

A nuclear power generation system disclosed in Japanese Patent Laid-open No. 62-218606 has a high-pressure turbine and an intermediate-pressure turbine, which correspond to a high-pressure turbine included in a conventional nuclear power generating system, and a moisture separator placed in a steam line interconnecting the high-pressure turbine and the intermediate-pressure turbine to separate moisture from wet steam in cooperation with a moisture separator and a heater disposed above a low-pressure turbine.

In the nuclear power generating system disclosed in Japanese Patent Laid-open No. 62-218606, the moisture separators (reheaters) are placed in the steam line interconnecting the high-pressure turbine and the intermediate-pressure turbine, and in a steam line interconnecting the intermediate-pressure turbine and the low-pressure turbine to separate moisture from and to heat exhaust steam discharged from the high-pressure turbine and the intermediate-pressure turbine. The moisture separators, which are additional apparatuses, increase area necessary for installing the components of the nuclear power generating system.

SUMMARY OF THE INVENTION

The present invention has been made in view of the foregoing problem and it is therefore an object of the present invention to provide a steam turbine power plant provided with steam separators and capable of reducing area necessary for installing the steam separators.

According to a first aspect of the present invention, a steam turbine power plant includes: a high-pressure turbine to be driven by steam generated by a steam generator; a first reheater for separating moisture from steam discharged from the high-pressure turbine and heating the steam; an intermediate-pressure turbine to be driven by the steam heated by the first reheater; a second reheater for heating steam discharged from the intermediate-pressure turbine; and a low-pressure turbine to be driven by the steam heated by the second reheater; wherein the intermediate-pressure turbine discharges dry steam.

According to a second aspect of the present invention, a method of operating a steam turbine power plant including a high-pressure turbine to be driven by steam generated by a steam generator, a first reheater for separating moisture from steam discharged from the high-pressure turbine and heating the steam, an intermediate-pressure turbine to be driven by the steam heated by the first reheater, a second reheater for heating steam discharged from the intermediate-pressure turbine, and a low-pressure turbine to be driven by the steam heated by the second reheater comprises: separating moisture from and heating steam discharged from the high-pressure turbine; supplying the steam heated and dried by the first reheater to the intermediate-pressure turbine; making the steam supplied to the intermediate-pressure turbine expand such that the intermediate-pressure turbine discharges dry steam; heating steam discharged from the intermediate-pressure turbine by the second reheater; and supplying the heated steam heated by the second reheater to the low-pressure turbine.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Although the preferred embodiments of the present invention will be described as applied to nuclear power plants, the present invention is applicable also to thermal power plants. In the following description, the term "reheater" is used for signifying both a steam separator for separating steam from exhaust steam discharged from a turbine, and a combination of a steam separator and a heater for heating exhaust steam.

Figure 1:
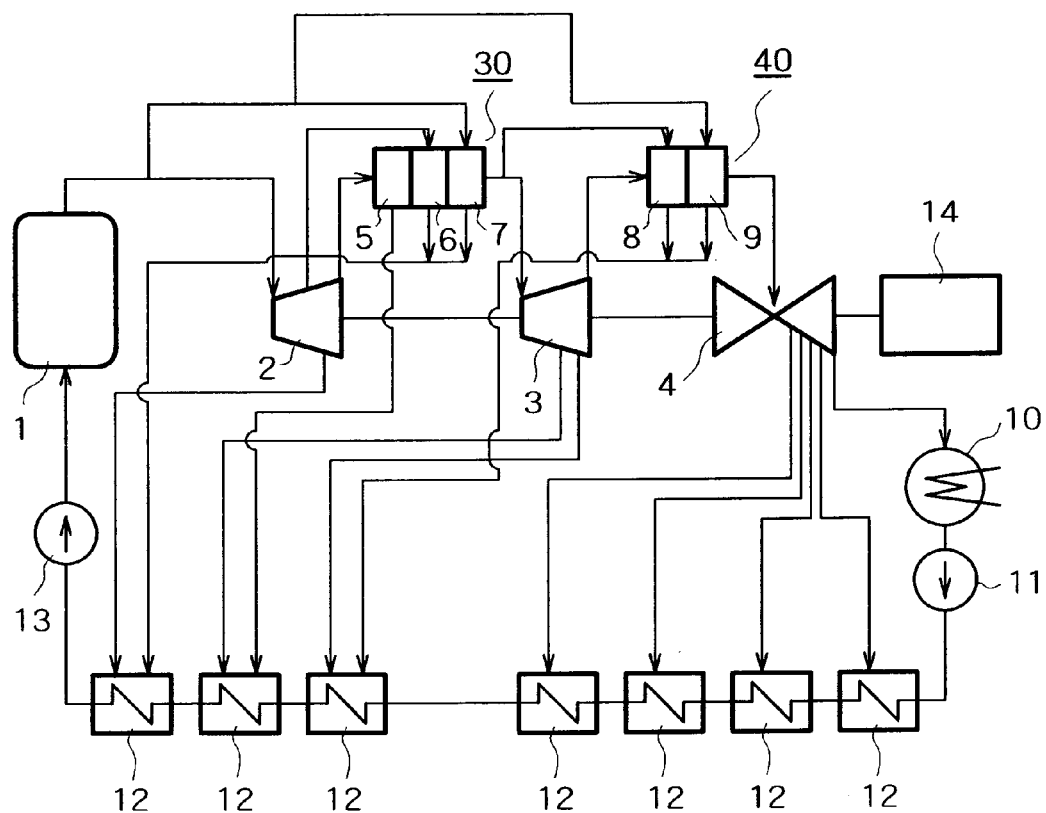
FIG. 1 is a block diagram of a steam turbine power plant in a first embodiment according to the present invention.

Referring to FIG. 1, a steam turbine power plant in a first embodiment according to the present invention for nuclear power generation includes a nuclear steam generating system 1, a high-pressure turbine 2 driven by steam generated by the nuclear steam generating system 1, an intermediate-pressure turbine 3 driven by exhaust steam discharged from the high-pressure turbine 2, a low-pressure turbine 4 driven by exhaust steam discharged from the intermediate-pressure turbine 3, a steam condenser 10 that condenses exhaust steam discharged from the low-pressure turbine 4 to reduce the pressure of the exhaust steam to a vacuum, a condensate pump 11 for pumping condensate produced by the steam condenser 10, a feedwater heater 12 for heating the condensate, a feedwater pump 13 for pumping the feedwater heated by the feedwater heater 12 to the nuclear steam generating system 1, and a power generator 14 connected to the turbine shaft of the low-pressure turbine 4.

A first reheater 30 is placed in a steam line for carrying exhaust steam discharged from the high-pressure turbine 2 to the intermediate-pressure turbine 3, and a second reheater 40 is placed in a steam line for carrying exhaust steam discharged from the intermediate-pressure turbine 3 to the low-pressure turbine 4. The first reheater 30 comprises a moisture separator 5 for separating moisture from the exhaust steam discharged from the high-pressure turbine 2, a first heater 6 for heating steam provided by the first moisture separator 5, and a second heater 7. The second reheater 40 comprises a first heater 8 for heating exhaust heat discharged from the intermediate-pressure turbine 3, and a second heater 9.

Extraction steam extracted from the high-pressure turbine 2 is supplied as heating steam to the first heater 6 of the first reheater 30, and steam generated by the nuclear steam generating system 1 is supplied as heating steam through a branch line branched from a steam line for carrying steam to the high-pressure turbine 2 to the second heater 7 of the first reheater 30. Steam heated by the first reheater 30 is supplied as heating steam through a branch steam line branched from a steam line for carrying the heated steam from the first reheater 30 to the intermediate-pressure turbine 3 to the first heater 8 of the second reheater 40. Steam generated by the nuclear steam generating system 1 is supplied as heating steam through a branch steam line branched from the steam line for carrying the steam to the high-pressure turbine 2 to the heater 9 of the second reheater 40.

Figure 2:
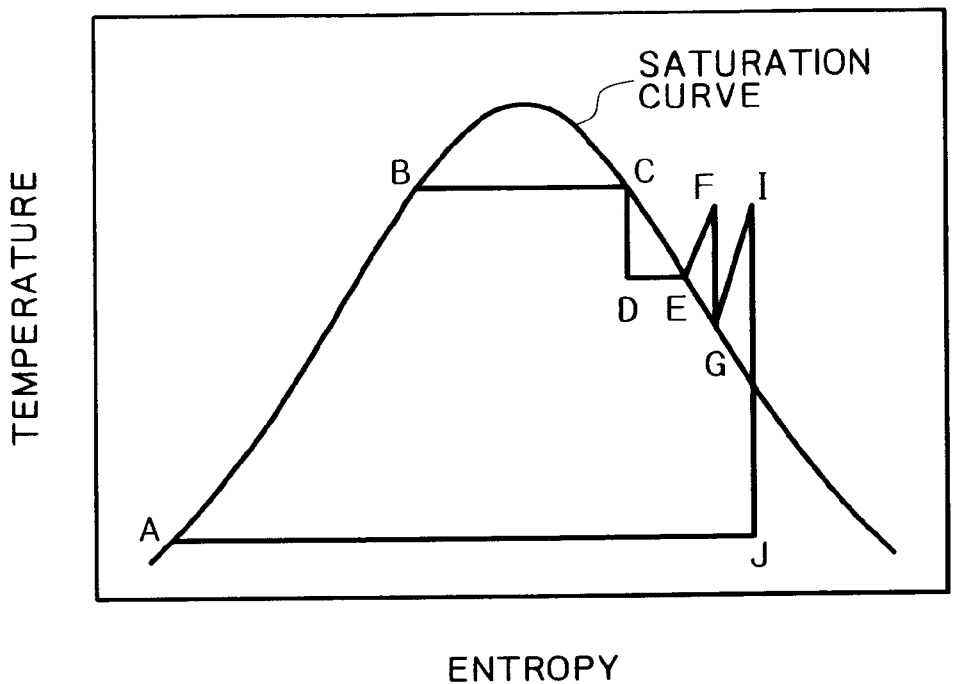
FIG. 2 is a temperature-entropy diagram of assistance in explaining a thermodynamic cycle that is carried out by the steam turbine power plant shown in FIG. 1.

FIG. 2 is a temperature-entropy diagram of assistance in explaining a thermodynamic cycle that is carried out by the steam turbine power plant shown in FIG. 1. Shown also in FIG. 2 is a saturation curve. A region over the saturation curve represents a dry steam state, and a region under the saturation curve represents a wet steam state. In the following description, saturation steam in which a liquid phase and a vapor phase (steam) coexist is called wet steam, and steam of a temperature not lower than saturation temperature including superheated steam is called dry steam. Although the term "saturated steam" signifies steam containing some saturated water (saturated liquid) in a strict sense, the same term will be used also for designating dry saturated steam not containing any saturated water.

Referring to FIG. 2, a segment A-C indicates a state change in which condensate is heated and evaporated by the nuclear steam generating system 1, a segment C-D indicates a state change caused by work done by the high-pressure turbine 2, a segment D-E indicates a state change caused by moisture separation by the first reheater 30, a segment E-F indicates a state change caused by heating by the first reheater 30, a segment F-G indicates a state change caused by work done by the intermediate-pressure turbine 3, a segment G-I indicates a state change caused by heating by the second reheater 40, a segment I-J indicates a state change caused by work done by the low-pressure turbine 4, and a segment J-A indicates a state change caused by steam condensation by the condenser 10.

The states of steam in the turbines 2, 3 and 4 and the reheaters 30 and 40 will be explained hereinafter. The temperature of steam supplied to the high-pressure turbine 2 is in the region under the saturation curve as indicated at C. Therefore, the steam at the steam inlet of the high-pressure turbine 2 is wet steam containing moisture. While the steam supplied to the high-pressure turbine 2 flows through the turbine stages of the high-pressure turbine 2, the thermal energy of the steam is converted into work on the turbine shaft of the high-pressure turbine 2, and the temperature of the steam drops as indicated by the segment C-D. Consequently, the wetness fraction of the steam increases as compared with the state of steam at the steam inlet of the high-pressure turbine 2. Since increase in wetness fraction increases loss, and the moisture contained in the steam causes the erosion of turbine blades, moisture contained in exhaust steam discharged from the high-pressure turbine 2 is separated from steam by the moisture separator 5 of the first reheater 30. Consequently, the wetness fraction of the exhaust steam discharged from the high-pressure turbine 2 decreases as indicated by the segment D-E. Steam discharged from the moisture separator 5 is heated by the first heater 6 and the second heater 7 of the first reheater 30 to raise its temperature as indicated by the segment E-F. Thus, the steam is heated to a temperature not lower than saturation temperature to produce superheated steam (dry steam).

Dry steam heated by the first reheater 30 is supplied to the intermediate-pressure turbine 3. The thermal energy of the dry steam is converted into mechanical work by the intermediate-pressure turbine 3 such that the state of the dry steam changes along the segment F-G and the dry steam remains dry at the outlet of the intermediate-pressure turbine 3; that is, the turbine stages of the intermediate-pressure turbine 3 are designed so that the temperature of the dry steam (the pressure of the dry steam) drops as the dry steam flows from the inlet to the outlet of the intermediate-pressure turbine 3 to a temperature not lower than saturation temperature.

Exhaust steam discharged from the intermediate-pressure turbine 3 is heated by the first heater 8 and the second heater 9 of the second reheater 40 to raise the temperature as indicated by the segment G-I. The steam heated by the second reheater 40 is supplied to the low-pressure turbine 4, in which the thermal energy is converted into mechanical work by the low-pressure turbine 4 and, consequently, the temperature of the steam drops as indicated by the segment I-J.

Figure 3:
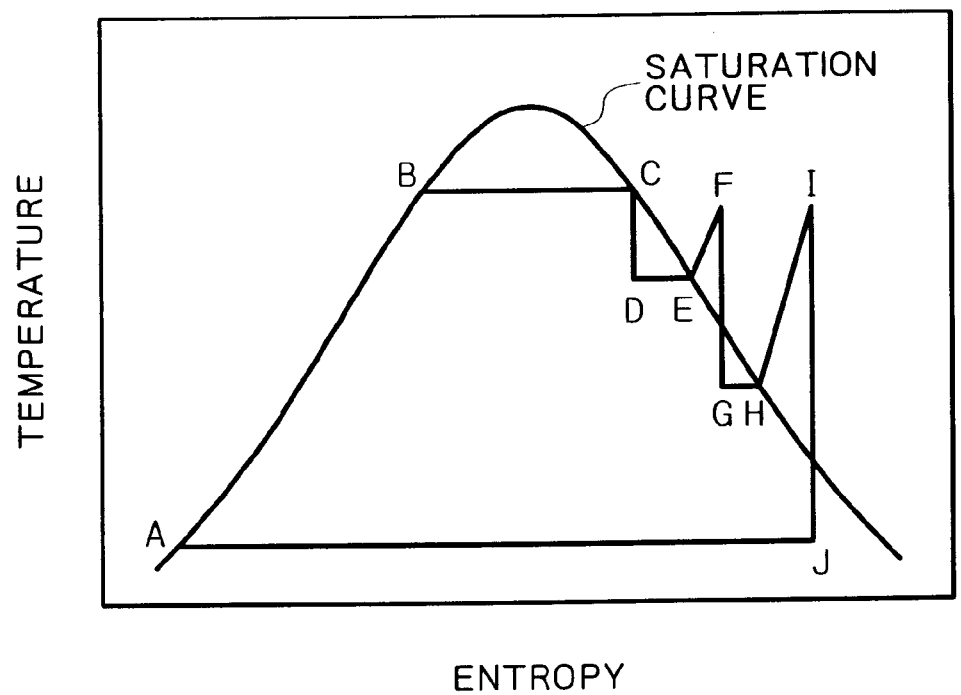
FIG. 3 is a temperature-entropy diagram of assistance in explaining a thermodynamic cycle that is carried out by a conventional steam turbine power plant.

FIG. 3 is a temperature-entropy diagram of assistance in explaining a thermodynamic cycle that is carried out by a conventional steam turbine power plant. Referring to FIG. 3, a segment A-C indicates a state change in which condensate is heated and evaporated by a nuclear steam generating system, a segment C-D indicates a state change caused by work done by a high-pressure turbine, a segment D-E indicates a state change caused by moisture separation by a reheater, a segment E-F indicates a state change caused by heating by the reheater, a segment F-G indicates a state change caused by work done by an intermediate-pressure turbine, a segment G-H indicates a state change caused by moisture separation by a reheater, a segment H-I indicates a state change caused by heating by the reheater, a segment I-J indicates a state change caused by work done by a low-pressure turbine, and a segment J-A indicates a state change caused by steam condensation by a condenser.

As obvious from FIG. 3, the steam at the steam outlet of the intermediate-pressure turbine (point G) is wet steam. Therefore, the reheater placed in an intermediate-pressure turbine exhaust steam line interconnecting the intermediate-pressure turbine and the low-pressure turbine must carry out both moisture separation and heating in view of improving thermal efficiency. The reheater includes a moisture separator for separating moisture from exhaust steam, and a heater for reheating the exhaust steam. Since the reheater of the conventional steam turbine power plant must have both a steam separator and a heater, it is difficult to miniaturize the reheater. Thus, the conventional reheater having both the moisture separator and the heater needs a large space for installation. Therefore, the reheater must be formed in small construction to install the same in an existing building.

In the steam turbine power plant of the present invention, the turbine stages of the intermediate-pressure turbine 3 are designed such that exhaust steam discharged from the intermediate-pressure turbine 3 is dry steam of a temperature not lower than saturation temperature. Therefore, work to be done by the intermediate-pressure turbine 2 must be reduced. The turbine stages of the low-pressure turbine 4 are designed such that an amount of work reduced from work to be done by the intermediate-pressure turbine 3 will be done by the low-pressure turbine 4. The turbine stages of the intermediate-pressure turbine 3 are designed so that the steam turbine power plant carries out the thermal cycle shown in FIG. 2 and the exhaust steam discharged from the intermediate-pressure turbine 3 is dry steam. Therefore, the second reheater 40 placed in the exhaust steam line for carrying exhaust steam discharged from the intermediate-pressure turbine 3 to the low-pressure turbine 4 does not need to carry out steam separation. The reheater can be divided roughly into a moisture separator for separating moisture from steam, and a heater for heating steam. The reheater can be miniaturized and a space necessary for installing the reheater can be reduced by miniaturizing or omitting the moisture separator. Since the exhaust steam discharged from the intermediate-pressure turbine 3 is dry steam, the thermal efficiency of the steam turbine power plant in the first embodiment does not decrease even though the second reheater 40 is not provided with any moisture separator, and the second reheater 40 can be installed in a small space.

The second reheater 40 of the steam turbine power plant in the first embodiment may be provided with a moisture separator. However, as mentioned above, the turbine stages of the intermediate-pressure turbine 3 are designed such that the exhaust steam discharged from the intermediate-pressure turbine 3 is dry steam and, therefore, even if the exhaust steam contains moisture, the amount of moisture is far less than that contained in the exhaust steam discharged from the intermediate-pressure turbine of the conventional steam turbine power plant. Therefore, a moisture separator for the second reheater 40 may be compact as compared with that included in the reheater of the conventional steam turbine power plant.

Steam turbine power plants in other embodiments according to the present invention will be described with reference to FIGS. 4 to 7, in which parts like or corresponding to those shown in FIG. 1 are denoted by the same reference characters and the description thereof will be omitted.

Figure 4:
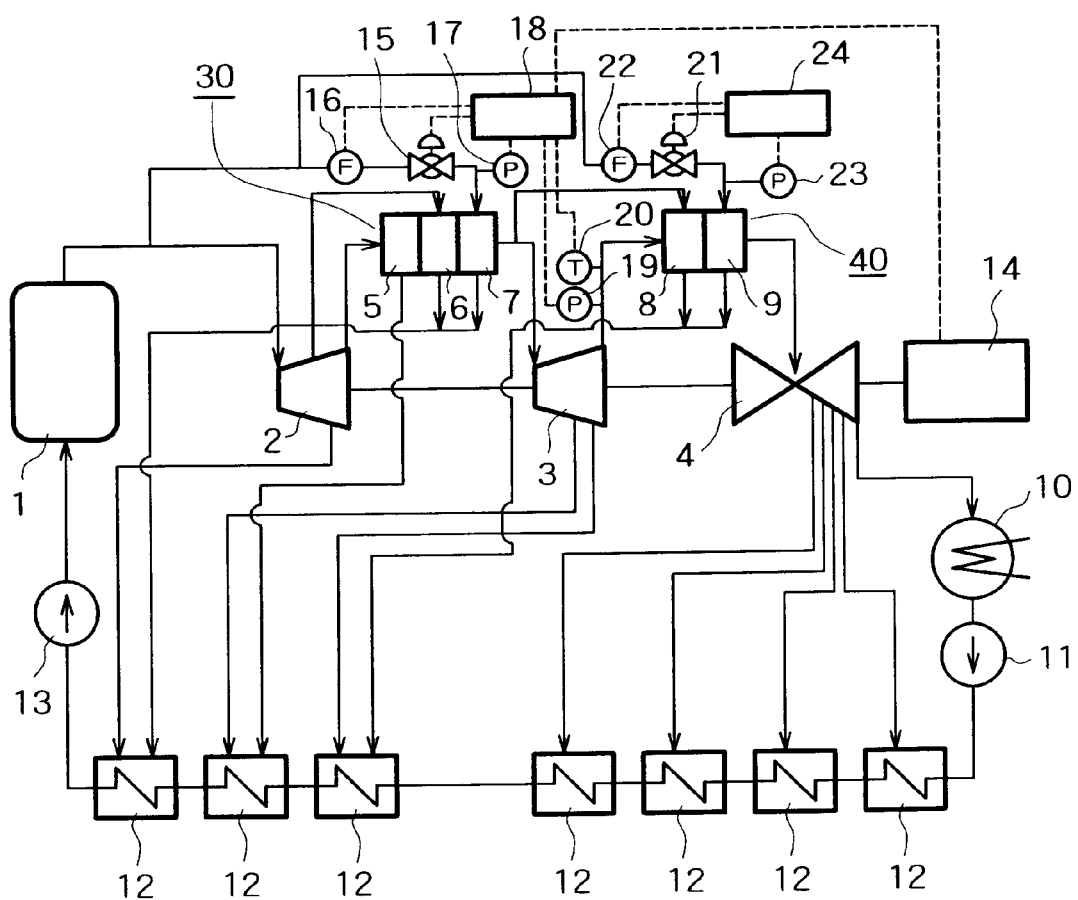
FIG. 4 is a schematic diagram of a steam turbine power plant in a second embodiment according to the present invention.

A steam turbine power plant in a second embodiment according to the present invention will be described with reference to FIG. 4. Referring to FIG. 4, a heating steam supply line for supplying heating steam to a second heater 7 included in a first reheater 30 is provided with a first heating steam pressure control valve 15 for regulating the pressure of heating steam being supplied to the second heater 7, a flow meter 16 for measuring the flow of heating steam, and a pressure measuring device 17 for measuring the pressure of heating steam being supplied to the second heater 7 of the first reheater 30. A heating steam supply line for supplying heating steam to a second heater 9 included in a second reheater 40 is provided with a second heating steam pressure control valve 21 for regulating the pressure of heating steam being supplied to the second heater 9, a flow meter 22 for measuring the flow of heating steam, and a pressure measuring device 23 for measuring the pressure of heating steam being supplied to the second heater 9 of the second reheater 40. Heating steam is supplied through branch steam lines branched from a steam line for carrying steam generated by a nuclear steam generating system 1 to a high-pressure turbine 2 to the second heater 7 of the first reheater 30 and the second heater 9 of the second reheater 40. An exhaust steam line for carrying exhaust steam discharged from an intermediate-pressure turbine 3 to the second reheater 40 is provided with a pressure-measuring device 19 for measuring the pressure of exhaust steam discharged from the intermediate-pressure turbine 3, and a temperature-measuring device 20 for measuring the temperature of exhaust steam discharged from the intermediate-pressure turbine 3.

A pressure control valve controller 18 controls the first heating steam pressure control valve 15. The pressure control valve controller 18 controls the first heating steam pressure control valve 15 on the basis of pressure and temperature measured by the pressure measuring device 19 and the temperature measuring device 20, respectively, placed in the exhaust steam line for carrying exhaust steam discharged from the intermediate-pressure turbine 3, and the output of a power generator 14 so that the intermediate-pressure turbine 3 discharges low-temperature superheated steam. The first heating steam pressure control valve 15 is controlled so that the flow of heating steam measured by the flow meter 16 coincides with a desired flow. Set conditions including a pressure which will be measured by the pressure measuring device 19 and a temperature which will be measured by the temperature measuring device 20 when the power generator generates power while the intermediate-pressure turbine 3 discharges low-temperature superheated steam are determined previously and the pressure control valve controller 18 executes control operations according to the set conditions.

The second heater 9 of the second reheater 40, similarly to the second heater 7 of the first reheater 30, uses part of steam generated by a nuclear steam generating system 1 as heating steam. The pressure of heating steam to be supplied to the second heater 9 of the second reheater 40 is regulated by the second heating steam pressure control valve 21 on the basis of pressure measured by the pressure measuring device 23 and the output of the power generator. A pressure control valve controller 24 controls the second heating steam pressure control valve 21 so that a flow measured by the flow meter 22 coincides with a desired flow. The pressure control valve controller 24 executes control operations so as to meet the predetermined relation between the output of the power generator and the flow of heating steam.

At the start of the steam turbine power plant and while the steam turbine power plant is operating under partial load, the turbine discharges low-temperature exhaust steam, and the low-temperature exhaust steam flows into the reheater. On the other hand, high-temperature steam as heating steam is supplied from the nuclear steam generating system to the heater of the reheater and hence the heater of the reheater is heated at a high working temperature. Since both the low-temperature steam and the high-temperature steam flow through the heater of the reheater, a thermal stress greater than that is induced while the steam turbine power plant is in normal operation is induced in the heater due to the large temperature difference between the low-temperature steam and the high-temperature steam. Such thermal stress will generate vibrations and may cause troubles in the component devices. Therefore, the thermal stress must be reduced.

In the steam turbine power plant shown in FIG. 4, the second reheater 40 placed in the exhaust steam line for carrying exhaust steam discharged from the intermediate-pressure turbine 3 includes only the heaters 8 and 9, and hence the intermediate-pressure turbine 3 must be controlled such that the intermediate-pressure turbine 3 discharges dry steam or superheated steam. Thus, the intermediate-pressure turbine 3 must be controlled so as to discharge dry steam or low-temperature superheated steam at the start of the steam turbine power plant and while the steam turbine power plant is operating under partial load to reduce the aforesaid temperature difference.

The flow of heating steam to be supplied to the first reheater 30 placed in the steam line for carrying exhaust steam discharged from the high-pressure turbine 2 to the first reheater 30 is controlled to reduce thermal stress that may be induced in the first reheater 30 at the start of the steam turbine power plant and while the steam turbine power plant is operating under partial load. The temperature measuring device 20 or the pressure-measuring device 19 is placed in the exhaust steam line for carrying exhaust steam discharged from the intermediate-pressure turbine 3. The pressure control valve controller 18 controls the first heating steam pressure control valve 15 to control the pressure of heating steam supplied to the first reheater 30 on the basis of a measured temperature measured by the temperature measuring device 20 or a pressure measured by the pressure measuring device 19, and the output of the power generator. Set conditions including a pressure which will be measured by the pressure measuring device 19 or a temperature which will be measured by the temperature measuring device 20 when the power generator generates power while the intermediate-pressure turbine 3 discharges dry saturated steam or low-temperature superheated steam are determined previously and the pressure control valve controller 18 executes control operations according to the set conditions.

Thermal stress that is induced in the second reheater 40 at the start of the steam turbine power plant and while the steam turbine power plant is operating under partial load, similarly to thermal stress that is induced in the first reheater 30, must be reduced. In the steam turbine power plant in the second embodiment, a controller controls the pressure of heating steam supplied to the second reheater 40 by controlling the second heating steam pressure control valve 21 on the basis of a temperature measured by the temperature measuring device 20 placed in the exhaust steam line for carrying exhaust steam discharged from the intermediate-pressure turbine 3 or a pressure measured by the pressure measuring device 19 placed in the same exhaust steam line, and controls the flow of steam. Since the temperature or the pressure of the exhaust steam discharged from the intermediate-pressure turbine 3 is dependent on the inlet temperature or the inlet pressure of steam supplied to the intermediate-pressure turbine 3, the temperature measuring device or the pressure measuring device may be disposed at the inlet of the intermediate-pressure turbine 3.

As apparent from the foregoing description, the intermediate-pressure turbine 3 is controlled so as to discharge dry steam or low-temperature superheated steam at the start of the steam turbine power plant and while the steam turbine power plant is operating under partial load to reduce the thermal stress induced in the first reheater 30 placed in the steam line for carrying exhaust steam discharged from the high-pressure turbine 2 by reducing the flow of the heating steam to reduce the temperature difference between the heated and the heating side of the first reheater 30. Similarly, thermal stress induced in the second reheater 40 due to the temperature difference between the heated and the heating side of the second reheater 40 can be reduced by reducing the flow of heating steam to reduce the temperature difference between the heated and the heating side of the second reheater 40.

Figure 5:
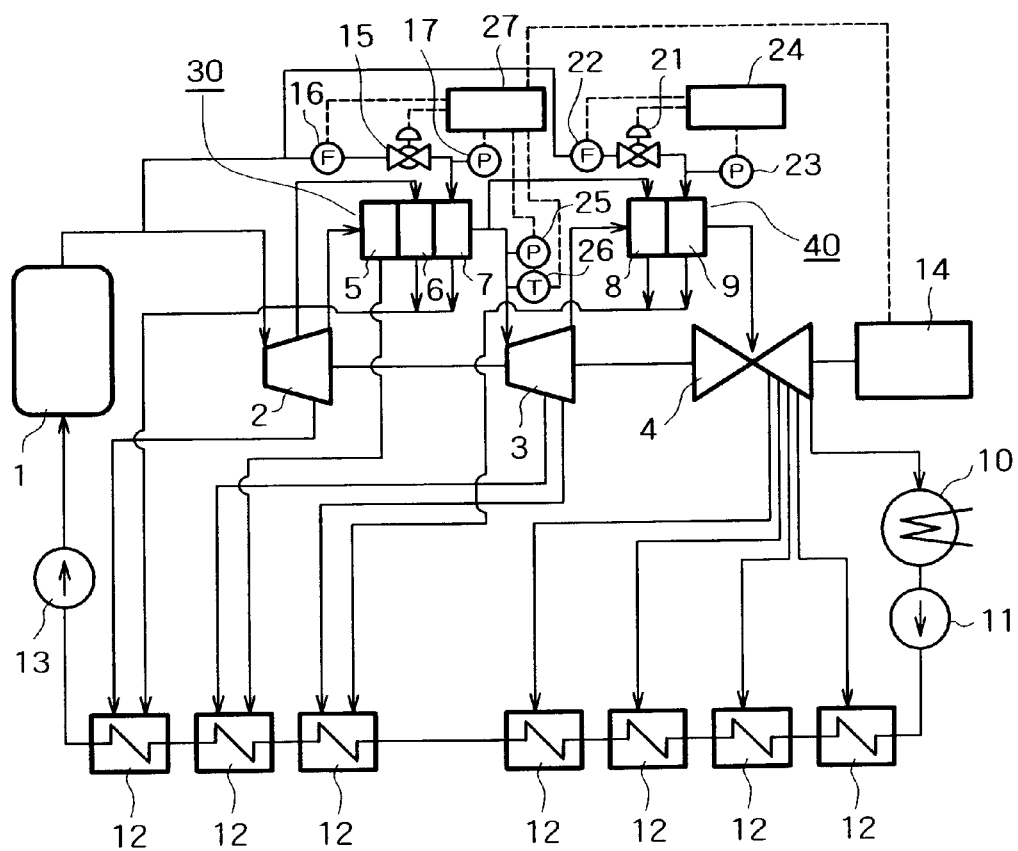
FIG. 5 is a schematic diagram of a steam turbine power plant in a third embodiment according to the present invention.

A steam turbine power plant in a third embodiment according to the present invention shown in FIG. 5 for a nuclear power plant has a first reheater 30 including a second heater 7 using part of steam generated by a nuclear steam generating system 1 as heating steam. The flow of heating steam is controlled on the basis of pressure measured by a pressure measuring device 25 disposed at the inlet of an intermediate-pressure turbine 3, temperature measured by a temperature measuring device 26 disposed at the inlet of the intermediate-pressure turbine 3, and the output of a power generator 14 so that the intermediate-pressure turbine 3 discharges low-temperature superheated steam (dry steam) by regulating the pressure of heating steam by a first heating steam pressure control valve 15 and by regulating the flow of heating steam measured by a flow meter 16 by a pressure control valve controller 27. The pressure control valve controller 27 executes control operations so as to meet the predetermined relation between pressure measured by the pressure-measuring device 25 and temperature measured by the temperature-measuring device 26, and the output of the power generator 14.

A second heater 9 included in a second reheater 40, similarly to the second heater 7 of the first reheater 30, uses part of steam generated by the nuclear steam generating system 1 as heating steam. The pressure of heating steam measured by a pressure measuring device 23 is regulated by a second heating steam pressure control valve 21, and the flow of heating steam is controlled by a pressure control valve controller 24 according to the output of the power generator 14. The pressure control valve controller 24 executes control operations so as to meet the predetermined relation between the flow of heating steam and the output of the power generator 14.

In the steam turbine power plant in the third embodiment, the flow and pressure of heating steam to be supplied to the first reheater 30 is controlled such that the intermediate-pressure turbine 3 discharges dry steam. Thus, the thermal stress that is induced in the first reheater 30 at the start of the steam turbine power plant and while the steam turbine power plant is operating under partial load can be reduced. Heating steam to be supplied to the second reheater 40 can be similarly controlled.

Figure 6:
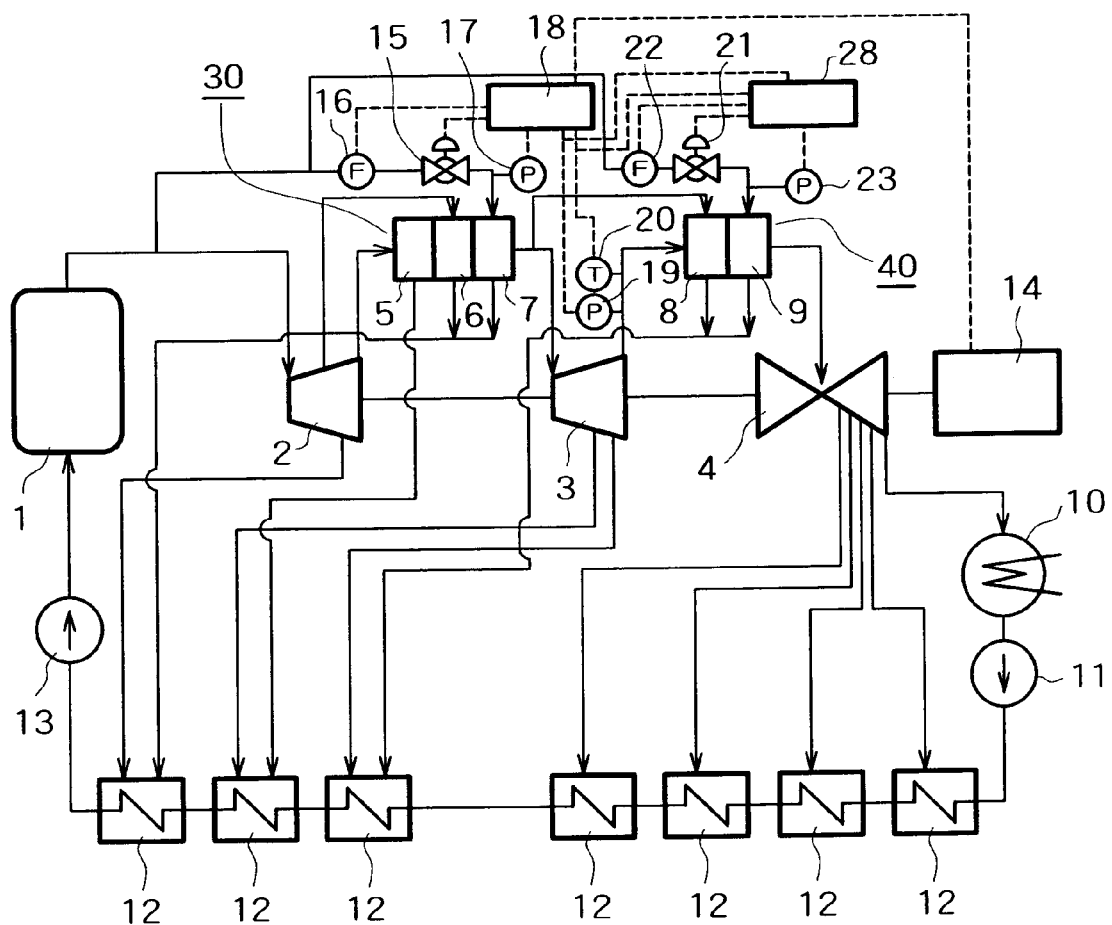
FIG. 6 is a block diagram of a steam turbine power plant in a fourth embodiment according to the present invention.

FIG. 6 shows a steam turbine power plant in a fourth embodiment according to the present invention. In the steam turbine power plant in the fourth embodiment, the flow of heating steam is controlled by controlling the pressure of heating steam by a first heating steam pressure control valve 15 and controlling flow measured by a flow meter 16 by a pressure control valve controller 18 on the basis of pressure measured by a pressure measuring device 19 placed in an exhaust steam line for carrying exhaust steam discharged from an intermediate-pressure turbine 3, temperature measured by a temperature measuring device 20 placed in the same exhaust steam line, and the output of a power generator 14 so that the intermediate-pressure turbine 3 discharges low-temperature superheated steam. The pressure control valve controller 18 executes control operations so as to meet the predetermined relation, for making the intermediate-pressure turbine 3 discharge low-temperature superheated steam, between temperature and pressure measured by the pressure measuring device 19 and the temperature measuring device 20, respectively, and the output of the power generator 14.

A second heater 9 included in a second reheater 40, similarly to a second heater 7 included in a first reheater 30, uses part of steam generated by a nuclear steam generating system 1 as heating steam. The flow of heating steam is controlled on the basis of pressure measured by a pressure measuring device 19 placed in an exhaust steam line for carrying exhaust steam discharged from an intermediate-pressure turbine 3, and temperature measured by a temperature measuring device 20 placed in the same exhaust steam line by regulating pressure of heating steam measured by a pressure measuring device 23 by a second heating steam pressure control valve 21 and by regulating the flow of heating steam measured by a flow meter 22 by a pressure control valve controller 28. The pressure control valve controller 28 executes control operations so as to meet the predetermined relation between the temperature or the pressure of exhaust steam discharged from the intermediate-pressure turbine 3, and the flow of heating steam. Thus, the heating steam supplied to the reheater is controlled to reduce thermal energy, whereby thermal stress induced in the reheater can be reduced.

Figure 7:
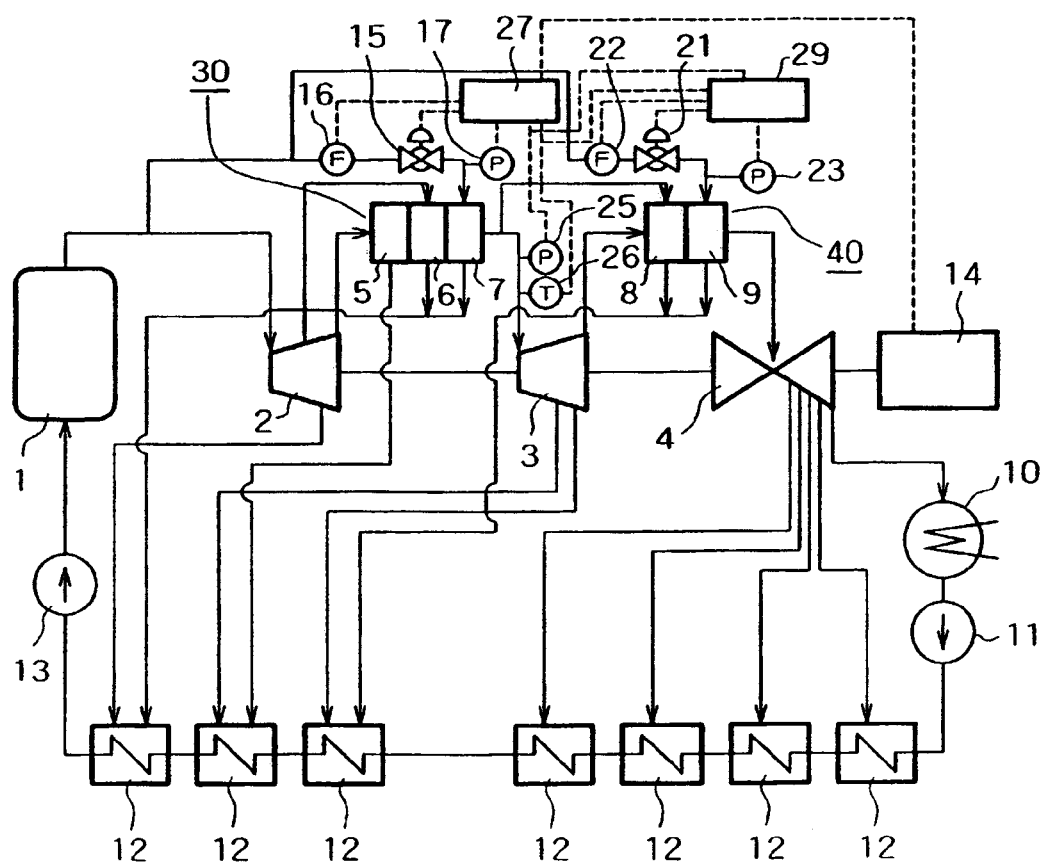
FIG. 7 is a block diagram of a steam turbine power plant in a fifth embodiment according to the present invention.

FIG. 7 shows a steam turbine power plant in a fifth embodiment according to the present invention. In the steam turbine power plant in the fifth embodiment, pressure of heating steam measured by a pressure measuring device 17 is regulated by a first heating steam pressure control valve 15, and the flow of steam measured by a flow meter 16 is controlled by a pressure control valve controller 27 on the basis of pressure measured by a pressure measuring device 25, temperature measured by a temperature measuring device 26, and the output of a power generator 14 so that an intermediate-pressure turbine 3 discharges low-temperature superheated steam. The pressure control valve controller 27 executes control operations so as to meet the predetermined relation, for making the intermediate-pressure turbine 3 discharge low-temperature superheated steam, between temperature and pressure measured by the pressure measuring device 25 and the temperature measuring device 26, respectively, and the output of the power generator 14.

A second heater 9 included in a second reheater 40, similarly to a second heater 7 included in a first reheater 30, uses part of steam generated by a nuclear steam generating system 1 as heating steam. The flow of heating steam is controlled on the basis of pressure measured by a pressure measuring device 19 placed at the inlet of the intermediate-pressure turbine 3, and temperature measured by a temperature measuring device 20 placed at the inlet of the intermediate-pressure turbine 3 by regulating the pressure of heating steam measured by a pressure measuring device 23 by a second heating steam pressure control valve 21 and by regulating the flow of heating steam measured by a flow meter 22 by a pressure control valve controller 29. The pressure control valve controller 29 executes control operations so as to meet the predetermined relation between temperature or pressure at the inlet of the intermediate-pressure turbine 3, and the flow of heating steam. Thus, the heating steam supplied to the reheater is controlled to reduce thermal energy, whereby thermal stress induced in the reheater can be reduced.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A steam turbine power plant comprising:
   a high-pressure turbine to be driven by steam generated by a steam generator;
   a first reheater for separating moisture from steam discharged from the high-pressure turbine and heating the steam;
   an intermediate-pressure turbine to be driven by the steam heated by the first reheater;
   a second reheater for heating exhaust steam discharged from the intermediate-pressure turbine; and
   a low-pressure turbine to be driven by the steam heated by the second reheater;
   wherein the intermediate-pressure turbine discharges dry steam.

2. The steam turbine power plant according to claim 1 further comprising:
   a temperature-measuring device for measuring temperature of steam supplied to or discharged from the intermediate-pressure turbine;
   a pressure measuring device for measuring pressure of steam supplied to or discharged from the intermediate-pressure turbine; and
   a controller for controlling the flow of heating steam to be supplied to the first or the second reheater on the basis of steam temperature measured by the temperature measuring device or steam pressure measured by the pressure measuring device.

3. The steam turbine power plant according to claim 1 further comprising a controller that executes control operations to make the intermediate-pressure turbine discharge dry steam at the start of the steam turbine power plant or while the steam turbine power plant is in operation under partial load.

4. A steam turbine power plant comprising:
   a high-pressure turbine to be driven by steam generated by a steam generator;
   a first reheater for separating moisture from steam discharged from the high-pressure turbine and heating the steam;
   an intermediate-pressure turbine to be driven by the steam heated by the first reheater;
   a second reheater for separating moisture from steam discharged from the intermediate-pressure turbine and heating the steam; and
   a low-pressure turbine to be driven by the steam heated by the second reheater;
   wherein turbine stages of the intermediate-pressure turbine are designed such that the intermediate-pressure turbine discharges dry steam.

5. A steam turbine power plant comprising:
   a high-pressure turbine to be driven by steam generated by a steam generator;
   a first reheater for separating moisture from steam discharged from the high-pressure turbine and heating the steam obtained by separating moisture from steam discharged from the high-pressure turbine;
   an intermediate-pressure turbine to be driven by the steam heated by the first reheater;
   a second reheater for heating steam discharged from the intermediate-pressure turbine; and
   a low-pressure turbine to be driven by the steam heated by the second reheater;
   wherein turbine stages of the intermediate-pressure turbine are designed such that the intermediate-pressure turbine discharges steam of a temperature not lower than saturation temperature.

6. A steam turbine power plant comprising:
   a high-pressure turbine to be driven by steam generated by a steam generator;
   a moisture separator for separating moisture from steam discharged from the high-pressure turbine;

a first reheater for heating steam provided by separating moisture from steam discharged from the high-pressure turbine by the moisture separator;

an intermediate-pressure turbine to be driven by the steam heated by the first reheater;

a second reheater for heating steam discharged from the intermediate-pressure turbine; and a low-pressure turbine to be driven by the steam heated by the second reheater;

wherein turbine stages of the intermediate-pressure turbine are designed such that the intermediate-pressure turbine discharges dry steam.

7. A nuclear power plant comprising:

a nuclear steam generating system for generating steam;

a high-pressure turbine to be driven by steam generated by the nuclear steam generating system;

a first reheater for separating moisture from steam discharged from the high-pressure turbine and heating the steam;

an intermediate-pressure turbine to be driven by the heat heated by the first reheater;

a second reheater for separating moisture from steam discharged from the intermediate-pressure turbine and heating the steam; and a low-pressure turbine to be driven by the steam heated by the second reheater;

wherein the intermediate-pressure turbine discharges dry steam.

8. A method of operating a steam turbine power plant comprising: a high-pressure turbine to be driven by steam generated by a steam generator, a first reheater for separating moisture from steam discharged from the high-pressure turbine and heating the steam, an intermediate-pressure turbine to be driven by the steam heated by the first reheater, a second reheater for heating exhaust steam discharged from the intermediate-pressure turbine, and a low-pressure turbine to be driven by the steam heated by the second reheater; said method comprising:

separating moisture from and heating steam discharged from the high-pressure turbine;

supplying the steam heated and dried by the first reheater to the intermediate-pressure turbine;

making the steam supplied to the intermediate-pressure turbine expand such that the intermediate-pressure turbine discharges dry steam;

heating steam discharged from the intermediate-pressure turbine by the second reheater; and supplying the heated steam heated by the second reheater to the low-pressure turbine.

9. The method according to claim 8, wherein heating steam to be supplied to the first reheater is controlled so that the intermediate-pressure turbine discharges dry steam at the start of the steam turbine power plant or while the steam turbine power plant is in operation under partial load.

* * * * *